Nov. 28, 1967 J. V. BERTSCHE 3,355,341
METHOD OF PERMANENTLY JOINING MATING PLASTIC REFLECTOR DISCS
Filed July 23, 1964
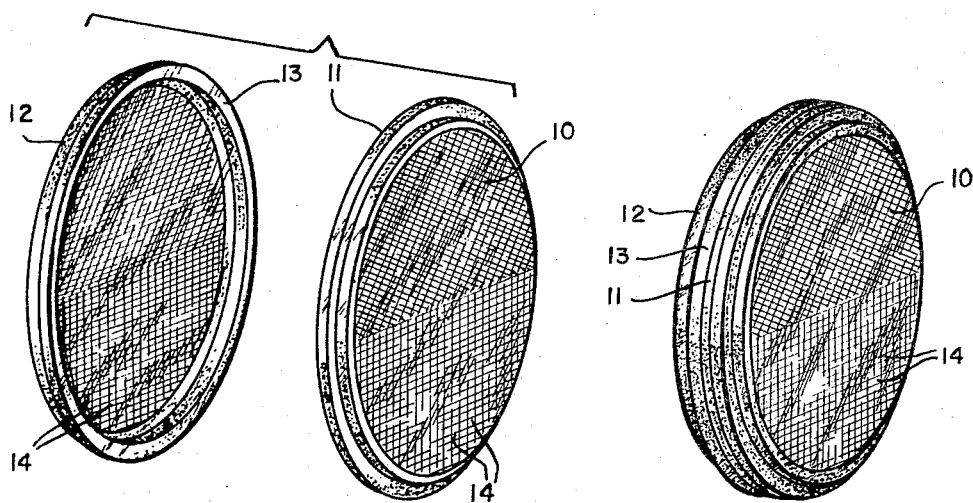
FIG.1          FIG.2
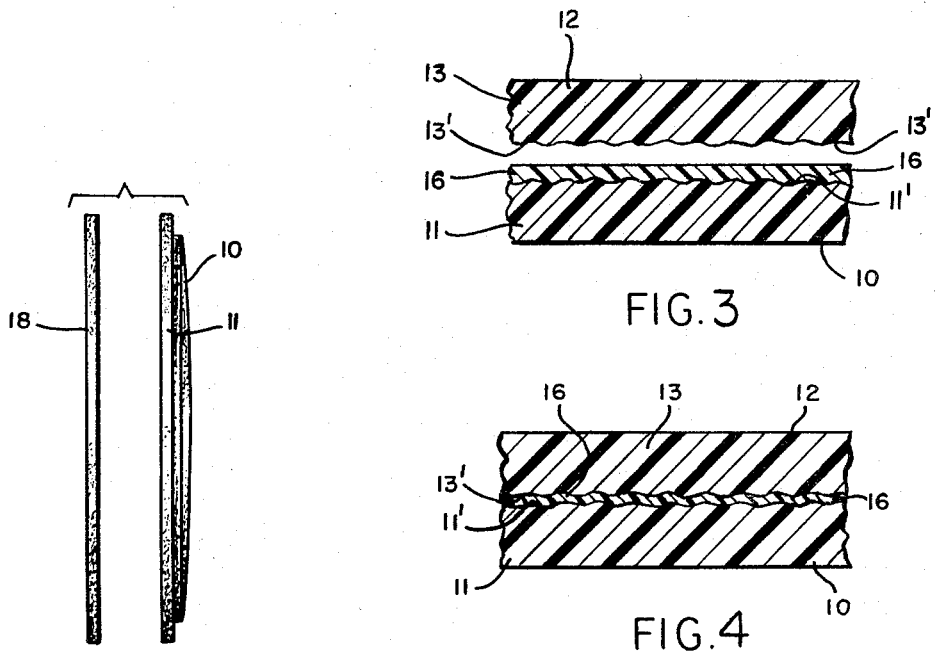
FIG.3
FIG.4
FIG.5
*INVENTOR*
Joseph V. Bertsche
by
*Morsell & Morsell*
Attorneys

United States Patent Office 3,355,341
Patented Nov. 28, 1967

3,355,341
METHOD OF PERMANENTLY JOINING MATING PLASTIC REFLECTOR DISCS
Joseph V. Bertsche, Milwaukee, Wis., assignor to Gleason Corporation, Milwaukee, Wis., a corporation of Wisconsin
Filed July 23, 1964, Ser. No. 384,731
1 Claim. (Cl. 156—295)

ABSTRACT OF THE DISCLOSURE

A method of permanently joining mating plastic reflector discs to form a tight, leakproof seal therebetween by means of a liquid bonding agent which is completely devoid of solvents which could produce fumes capable of deleterious chemical reaction with such plastic material to reduce the reflective properties of said disc.

---

This invention relates to an improved method of joining plastic pieces, and more particularly to a new and improved method of forming a tight, weatherproof bond between two mating plastic reflector elements or the like.

In the manufacture of acrylic plastic reflectors such as are comonly used on trucks and other vehicles, as well as for numerous other uses, the conventional method is to bond two colored, circular reflex lenses together, back to back, by spin welding to form an integral reflector unit. In the spin weld method one of the mating discs is held stationary while the other is rotated rapidly and with predetermined pressure to create friction between the abutting rim portions of said members, thereby generating enough heat to fuse or weld the same together. As will be appreciated, in order to provide an effective, weather-proof seal by this method requires considerable skill and experience.

Attempts have been made in the past to provide other, simpler methods of joining plastic discs or the like, such as with a liquid glue or cement, but, unfortunately, the commercially-available liquid adhesives which have been previously used for this purpose contain solvents which have a deleterious reaction with the plastic members. Reflex reflector lenses of the type herein concerned usually have a multitude of fine trihedral points formed on their inner surfaces which function as tiny reflecting elements, and it has been found that the solvents present in the liquid adhesive tend to craze and dull said points, thus substantially lessening their effectiveness as reflectors.

With the above considerations in mind, the principal object of the present invention is to provide a novel method of joining mating plastic members, preferably utilizing a special liquid or semi-solid adhesive consisting essentially of a cyanoacrylate monomer modified with a suitable thickening agent and plasticizer, and wherein there is no solvent to adversely affect said plastic members.

A further object of the invention is to provide a novel method of joining two mating plastic pieces by means of a liquid bonding agent, as described, which method requires but a few seconds, and which does not require any substantial degree of skill and experience.

A further object of the invention is to provide a novel method of joining two mating plastic pieces by means of a liquid adhesive, as described, which method provides an effective weather-proof joint therebetween regardless of irregularities or imperfections in the abutting surfaces of said members, said adhesive functioning to seal any spaces between said mating pieces.

A further object of the invention is to provide a novel method of permanently joining two pieces which is particularly well adapted for use in the manufacture of acrylic plastic reflector lenses, as described, but which improved method can also be advantageously employed in the manufacture and assembly of numerous other products, and including items formed of other plastic materials.

Still further objects of the present invention are to provide a new and improved method of joining two mating plastic pieces, which method is efficient, which provides a strong and completely reliable bond, and which is otherwise particularly well adapted for its intended purposes.

With the above and other objects in view, which other objects and advantages of the present invention will become apparent hereinafter, the invention comprises the improved method of joining a pair of plastic units as hereinafter described, and any and all modifications or variations therein as may come within the spirit of said invention and within the scope of the appended claim.

In the accompanying drawing, wherein there is illustrated a typical plastic reflector of the type herein concerned, and a modified form thereof, and wherein the same reference numerals designate the same or similar parts in all of the views:

FIG. 1 is a perspective view of a pair of reflex lenses prior to the joinder of the same to form a reflector;

FIG. 2 is a perspective view of the reflector illustrated in FIG. 1 in its assembled condition;

FIG. 3 is a greatly magnified fragmentary transverse sectional view showing the adjacent rim surfaces of the plastic discs just prior to their joinder;

FIG. 4 is a magnified sectional view similar to FIG. 3, showing the discs bonded together; and FIG. 5 is a side elevational view of another type of reflector prior to assembly.

Referring now more particularly to FIGS. 1 and 2 of the drawing, illustrated therein is a typical plastic reflector of the type used on trucks and other vehicles, as well as for countless other uses. In most instances said reflectors are molded of an acrylic plastic, although other plastics could also be used and the particular type employed is not critical to the present invention. As will be seen, said reflector includes a first reflex lens 10 having a peripheral rim 11, and a second, identical lens or disc 12 having a peripheral rim 13, said discs normally being red in color, and the inner surfaces of said discs being provided with a plurality of trihedral points 14 which function as multiple reflector elements. When said discs 10 and 12 are joined together to form an integral reflector unit it is essential that the abutting rims 11 and 13 thereon be sealed, in order to prevent dirt and water or other harmful agents, from entering the unit and dulling or damaging said points. This is particularly important, of course, with trucks and other vehicles which frequently have to travel through slush and mud, as well as water, and wherein the continued effectiveness of said reflectors is critical to highway safety.

As hereinabove mentioned, the conventional method of manufacturing reflectors of the type herein concerned is to spin weld the mating lenses or discs together. In this method one piece is held stationary while the other is positioned thereagainst with predetermined pressure and rotated at a high speed, thus creating friction and heat which functions to fuse the rim portions of said discs together. This method is not only time-consuming, but to obtain an effective, weatherproof seal requires workmen who are skilled and experienced, which obviously adds substantially to the manufacuring cost of the reflectors.

In an effort to overcome the shortcomings and obvious disadvantages of spin welding, attempts have been made in the past to provide a method of permanently joining the two discs by means of glue or cement. Such a method is used in assembling plastic toys and other articles wherein the connected sections do not have to form an air-tight enclosure when assembled, there being one or more openings in said articles through which the fumes from the solvent or glue can escape to the atmosphere. With reflectors of the type herein concerned, however, a weather-proof seal is required between the lenses in order to prevent water or dirt from entering the assembled unit, as described. Unfortunately, it has been found that the fumes created by the solvents in conventional bonding agents are trapped within the assembled reflector and the chemical action thereof on the plastic tends to craze or dull the trihedral points. The result is a reflector of inferior reflective properties and quality.

In accordance with the present invention, the mating lenses 10 and 12 of the reflector are joined by means of a liquid or semi-solid adhesive which is specially formulated to eliminate fumes which are harmful to the plastic. In the preferred form of the invention, said liquid adhesive consists essentially of a cyano-acrylate monomer modified with a suitable thickening agent and plasticizer, such as are well known in the art. No solvents are included in said adhesive, and it is adapted to set rapidly at room temperature, without the application of heat. It is to be understood, of course, that said adhesive is not to be limited or confined to an exact composition formula and proportions, as variations could obviously be made therein by one skilled in the art while still incorporating the basic and critical features thereof, and while still coming within the spirit of the invention.

In assembling a reflector of the type illustrated, the liquid adhesive 16 (FIGS. 3 and 4) is applied to the face of the annular rim on one of the reflex lenses 10 or 12, as for example the rim 11 on the disc 10, and said disc is positioned and held against the disc 12 with said rim in abutting relationship to the rim 13. Slight manual pressure to retain said discs in close contact while simultaneously rotatably moving one of said lenses or discs relative to the other to cause said adhesive bonding agent to be spread evenly between said abutting rim surfaces around the entire circumference thereof thus providing a thin film of adhesive between said rim surfaces. Immediately a polymerization reaction occurs which produces a reliable, permanent bond between the discs in a matter of seconds.

As hereinabove described, the principal advantage of the adhesive employed in the present invention is that there are no solvents therein which create fumes to dull or craze the trihedral points 14. Thus the present invention provides, for the first time, a method of joining a pair of mating plastic lenses by means of a liquid bonding agent without lessening or destroying the reflective qualities of the finished product.

A further important advantage of the relatively fluid bonding agent utilized in the present invention is that there are no minute openings between the abutting disc rims, thereby providing a really effective weather-proof seal. In FIG. 3, for example, there is illustrated a greatly magnified fragmentary sectional view showing the unavoidable irregularities in the surface 13' of the disc rim 13, and the corresponding rim surface 11' on the disc 10, the latter having had the adhesive 16 applied thereto. As will be seen in FIG. 4, when said rims 11 and 13 are pressurably joined, the bonding agent 16 flows into and fills the multitude of spaces created by the irregularities in said abutting rim surfaces, thus sealing the same and providing a completely weather-proof joint.

In addition to the use of the present method in assembling reflectors of the type formed of a pair of mating reflex lenses, as described, the invention can also be used to join other types of reflectors, such as that shown in FIG. 5. In said modified reflector design the lens 10 is merely glued to a flat circular back member 18, and the method of bonding said pieces is identical to that hereinbefore described. Reflectors of the type shown in FIG. 5 are frequently provided with advertising or indicia such as a school name, or emblem, on the back member 18, and are ordinarily mounted on the bumper of a car. Obviously, in a novelty device of this type it is important to minimize manufacturing costs, and the present invention is very advantageous in this respect. Numerous other items and products can also be assembled in accordance with the present invention, including such items as throw-away plastic lights, plastic containers, toys, and, in fact, any products having mating pieces which are joined together to form an integral unit.

From the foregoing it will be seen that the present invention provides a new and improved method of forming a tight, weather-proof bond between two plastic pieces wherein no heat is required, and wherein there is no deleterious chemical reaction. Moreover, the method comprising the present invention is fast, it does not require any skill or experience, and it provides a strong and completely reliable bond between said pieces.

It is to be understood, as hereinabove mentioned, that numerous variations and additional uses of the present invention will undoubtedly occur to those skilled in the art, and it is intended to include herein not only the particular process and uses illustrated and described, but also any and all changes and modifications thereof as may come within the spirit of said invention, and within the scope of the following claim.

What I claim is:

A method of manufacturing a plastic reflector comprising the steps of: molding a first plastic reflex lens having a concave inner surface with a plurality of trihedral reflector points formed thereon and having a peripheral rim with a flat inner surface; molding a second, similar plastic reflex lens having a concave inner surface with a plurality of trihedral reflector points formed thereon and having a peripheral rim with a flat inner surface; applying to the inner rim surface of one of said lenses a non-solid, polymerizable bonding agent consisting essentially of a cyano-acrylate monomer modified with a thickening agent and plasticizer, said bonding agent being completely devoid of solvents which could produce fumes capable of deleterious chemical reaction with such plastic material to dull said trihedral reflector points, and said bonding agent being adapted to set in less than one minute at room temperature; immediately positioning said lenses with their inner surfaces in facing relationship with said inner rim surfaces abutting, and with said non-solid bonding agent therebetween; immediately pressurably urging said lens rims together and simultaneously rotatably moving one of said lenses relative to the other to cause said bonding agent to be spread evenly between said abutting rims around the entire circumference thereof; and holding said lenses together with said rims closely abutting for less than a minute to cause the polymerization of said bonding agent to permanently secure said lenses together in tight, leakproof engagement.

References Cited

UNITED STATES PATENTS

| | | | |
|---|---|---|---|
| 2,794,788 | 6/1957 | Coover et al. | 156—295 X |
| 3,160,542 | 12/1964 | Foye | 156—295 X |
| 3,223,083 | 12/1965 | Cobey | 128—92 |

EARL M. BERGERT, *Primary Examiner.*

HAROLD ANSHER, *Examiner.*